United States Patent [19]

Yoshida et al.

[11] Patent Number: 5,798,887

[45] Date of Patent: Aug. 25, 1998

[54] APPARATUS FOR ABSORBING STATOR VIBRATIONS IN COMPUTER STORAGE APPARATUS

[75] Inventors: Mitsuaki Yoshida, Yokohama; Hisashi Kaneko, Kawasaki, both of Japan

[73] Assignee: Fujitsu Limited, Kawasaki, Japan

[21] Appl. No.: 506,554

[22] Filed: Jul. 25, 1995

[30] Foreign Application Priority Data

Sep. 30, 1994 [JP] Japan .................. 6-237598

[51] Int. Cl.$^6$ .............. G11B 17/04; G11B 17/08; G11B 17/02

[52] U.S. Cl. .............. 360/99.08; 360/99.04; 360/99.12

[58] Field of Search .............. 360/99.08, 99.04, 360/99.05, 99.12, 99.07, 97.01–97.04; 369/263, 264; 310/51, 67 R, 91

[56] References Cited

U.S. PATENT DOCUMENTS

| | | | |
|---|---|---|---|
| 4,760,299 | 7/1988 | Dickie et al. | 310/51 |
| 5,365,388 | 11/1994 | Maughan et al. | 360/99.08 |
| 5,376,850 | 12/1994 | Elsing et al. | 310/51 |
| 5,481,144 | 1/1996 | Dunfield et al. | 360/99.08 |
| 5,504,638 | 4/1996 | Kinoshita et al. | 360/98.08 |

FOREIGN PATENT DOCUMENTS

| | | |
|---|---|---|
| 57-12112 | 1/1982 | Japan . |
| 62-287465 | 12/1987 | Japan . |
| 515106 | 1/1993 | Japan . |
| 6245457 | 9/1994 | Japan . |

*Primary Examiner*—Tom Thomas
*Assistant Examiner*—Adriana Giordana
*Attorney, Agent, or Firm*—Greer, Burns & Crain, Ltd.

[57] ABSTRACT

A rotary driving apparatus controls the generation of vibration and noise due to high speed rotation, to realize high accuracy rotation, so that a storage apparatus such as a disk drive can have high speed rotation and improved storing density on its recording medium.

The apparatus includes a fixed shaft for rotatably supporting a rotor, a bearing fitted between the shaft and the rotor, at least two projections projecting from the surface of the shaft, and a stator coil mounted on the projections. The projections absorb stator vibration, and isolate the head, the storage disk and other parts from the stator vibrations. A gap area is formed between the stator coil and the shaft to dampen vibrations created by the stator. The gap may be filled with vibration-absorbing material.

30 Claims, 7 Drawing Sheets

APPARATUS FOR ABSORBING STATOR VIBRATIONS IN COMPUTER STORAGE APPARATUS

BACKGROUND OF THE INVENTION

The present invention relates to an apparatus for reducing stator vibration and noise in computer storage apparatus. More particularly, this invention relates to electronic storage apparatus having a spindle motor whose stator is at least partially isolated from the fixed shaft or other part to which the stator is secured by vibration absorbing material, so that vibrations created by the stator are at least partially attenuated or absorbed and only reach the other parts of the storage apparatus in reduced amplitude, if at all.

Continuous improvements have been made in storage apparatus such as computer disk drives. Spindle motors, for example, are now capable of rotating at a higher velocity. However, higher velocity results in higher vibration and noise level. Vibration must be controlled as much as possible to improve recording density. Low noise level is another requirement in the market.

FIG. 1 is a schematic diagram illustrating a portion of a conventional rotary driving apparatus. A spindle hub 1 stacks a recording medium (not shown). Two bearings 2 assist in rotating the recording medium attached to the spindle hub 1. A shaft 3 is fitted to the bearings 2 and a flange 4. The shaft 3 is secured to the flange 4 by pressurized insertion or threading methods. A screw hole 9 within the shaft 3 is used with a screw (not shown) to secure a cover (not shown) to the storage apparatus.

The rotor (rotor magnet part) 5 includes a magnet 5a and a yoke 5b. The rotor 5 is the rotational part of the spindle motor. A stator (stator coil part) 7 has a coil 7a and a stator core 7b. The stator is the fixed part of the spindle motor. The shaft 3 is inserted through the stator core 7b by a pressurized insertion method. The shaft 3 is knurled. These elements are fixed together with a bonding agent such as Araldite. Araldite achieves excellent hardness after it sets. Known DC brushless motors are described in Japanese Laid-open Patent Application No. 53-66509.

However, during the rotary driving, the spindle motor shown in FIG. 1 generates vibration caused by revolution of the bearing balls. Magnetic vibration due to cogging or deviation of the magnetic center also causes vibration. Structural resonance also causes vibration.

Vibration generated by turning of the bearing balls depends on the roundness of the balls and undulations in the inner race or outer race. Vibration due to cogging (torque variation by magnetic absorbing effect) results from changes in the positional relationship of the poles and slots. Moreover, axial vibration is generated due to an imperfect magnetic working point created by deviations between the rotor and stator. Such deviations are due to variations occurring during assembly of the spindle motor.

As shown in FIG. 2, structural resonance also causes vibration. As the stator 7 energizes the rotor 5 to rotate, a force is applied to the rotor 5 to control inertia of the storage medium, to overcome windage loss generated by high speed rotation of the storage medium, and to overcome axial loss generated by a frictional torque on the bearings 2.

As a result, the stator 7 torques in a direction B inverse to the rotating direction A. Therefore, a torsional resonance is generated by the shaft 3 working as a torsional spring, and the stator 7 working such as an inertial force.

Vibration and noise are generated due to a bending resonance in the stator 7. The shaft 3 acts as a beam, and the stator 7 acts as a mass bending the shaft 3. Such resonance deflects the flange 4 (FIG. 1).

Recently, a magnetic disk apparatus was introduced having a double-supporting structure in which both ends of the spindle motor shaft are supported in order to improve accuracy. However, vibration generated in the spindle motor is transmitted through a base and a cover, causing vibration in the head via an actuator. This adversely affects the positioning accuracy of the magnetic head.

Moreover, the spindle motor artificially functions as a voice coil, and the base functions like a conic loudspeaker, resulting in a high level noise. Thus, there is a need to control magnetic vibration and structural resonance, and to reduce vibrations and noise.

SUMMARY OF THE INVENTION

Accordingly, one object of the present invention is to provide a rotary driving apparatus that controls vibration and noise caused by high speed rotation of a rotor. By reducing vibration, high accuracy rotation is realized.

Another object of the present invention is to provide a storage apparatus that controls generation of vibration and noise caused by high speed rotation of a spindle motor. By reducing vibration and noise, the head reads and writes information more accurately, thus, increasing the storage density of a recording medium.

Another object of the present invention is to provide a storage apparatus capable of suppressing vibration and noise generated by the spindle motor. Such suppression enables higher speeds and highly accurate positioning of the head.

One aspect of the present invention is a rotary driving apparatus in a storage apparatus having a stator and a rotor. A shaft or other fixed part rotatably supports the rotor through a bearing which is fitted between the fixed part and the rotor. At least two circumferential ring-shaped vibration dampeners are fixed between the stator and the fixed part by a bonding agent. The ring-shaped dampeners are fixed such that an annular gap remains between the stator, the rings, and the fixed part. A bonding agent secures the dampeners to the stator and the fixed part. During assembly, excess bonding agent can fill the annular gap and harden to form a solid tubular vibration dampener.

Another aspect of the invention includes the combination of a stator, at least two ring-shaped vibration dampeners fixed between the stator and the fixed part, and a sheet-shaped vibration dampener located between the stator and a rest. The rest is located on the fixed part beneath the stator. The sheet-shaped vibration dampener is a sheet material constructed from a resin or a rubber material capable of absorbing vibrations. The sheet-shaped vibration dampener also improves accuracy of the stator's fitting position.

In yet another aspect of the invention, at least two ring-shaped vibration dampeners are fixed between the stator and the fixed part. The sheet-shaped vibration dampener is located between the stator and the rest on the fixed part. However, the dampener is in a slit in the rest.

Another embodiment has a tubular-shaped vibration dampener fixed between the fixed part and the stator. The tubular-shaped dampener extends to a base member or flange, and has a rest which supports and sets the position of the stator.

Another aspect of the invention also includes a base member or flange having an opening. The shaft is supported by damping members located in the opening. A sheet-shaped damping material located between the shaft and the base member absorbs vibration transmitted from the shaft. The vibration is absorbed or attenuated, thus controlling transmission of vibration to the other parts. As a result, noise generation is also controlled.

In all of the above embodiments, high speed rotary driving is improved by reducing vibration. Use of the present invention in a storage apparatus attenuates the transfer of vibration from the rotary driving apparatus to the head, the storage medium and other parts. As a result, the storage density of the storage medium can be increased and the accuracy of the head operations improved.

The above and other objects, features, and advantages of the present invention will become more apparent from the following detailed description with reference to the drawings.

DETAILED DESCRIPTION OF THE INVENTION

Figure 1:
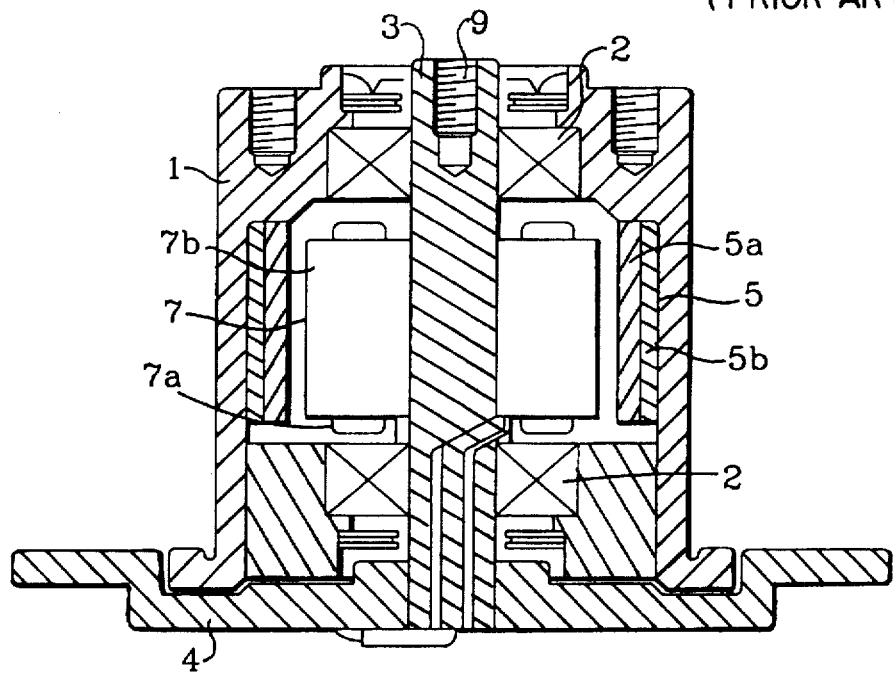
FIG. 1 is a diagram of a portion of a prior art rotary driving apparatus.
Figure 2:
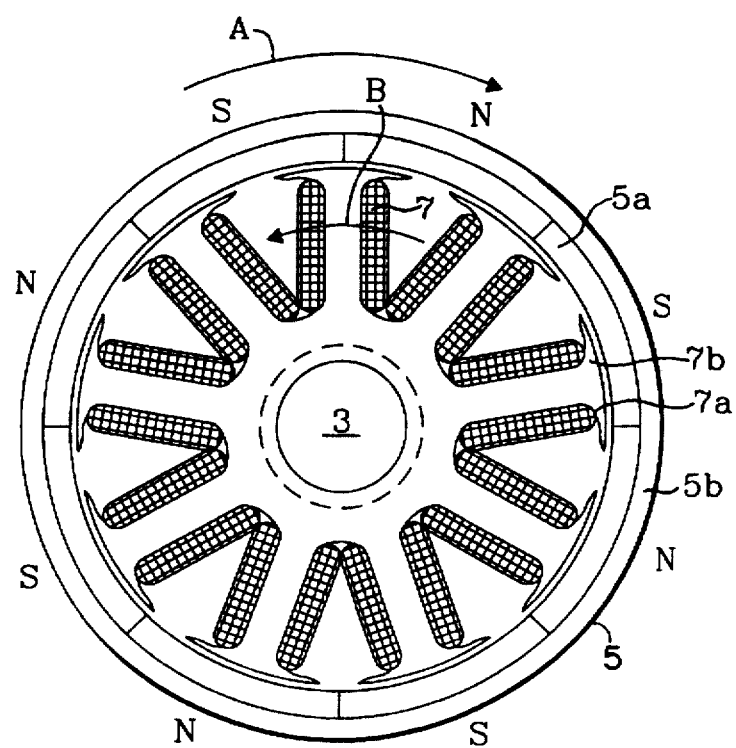
FIG. 2 is another diagram of a portion of a prior art rotary driving apparatus.
Figure 3:
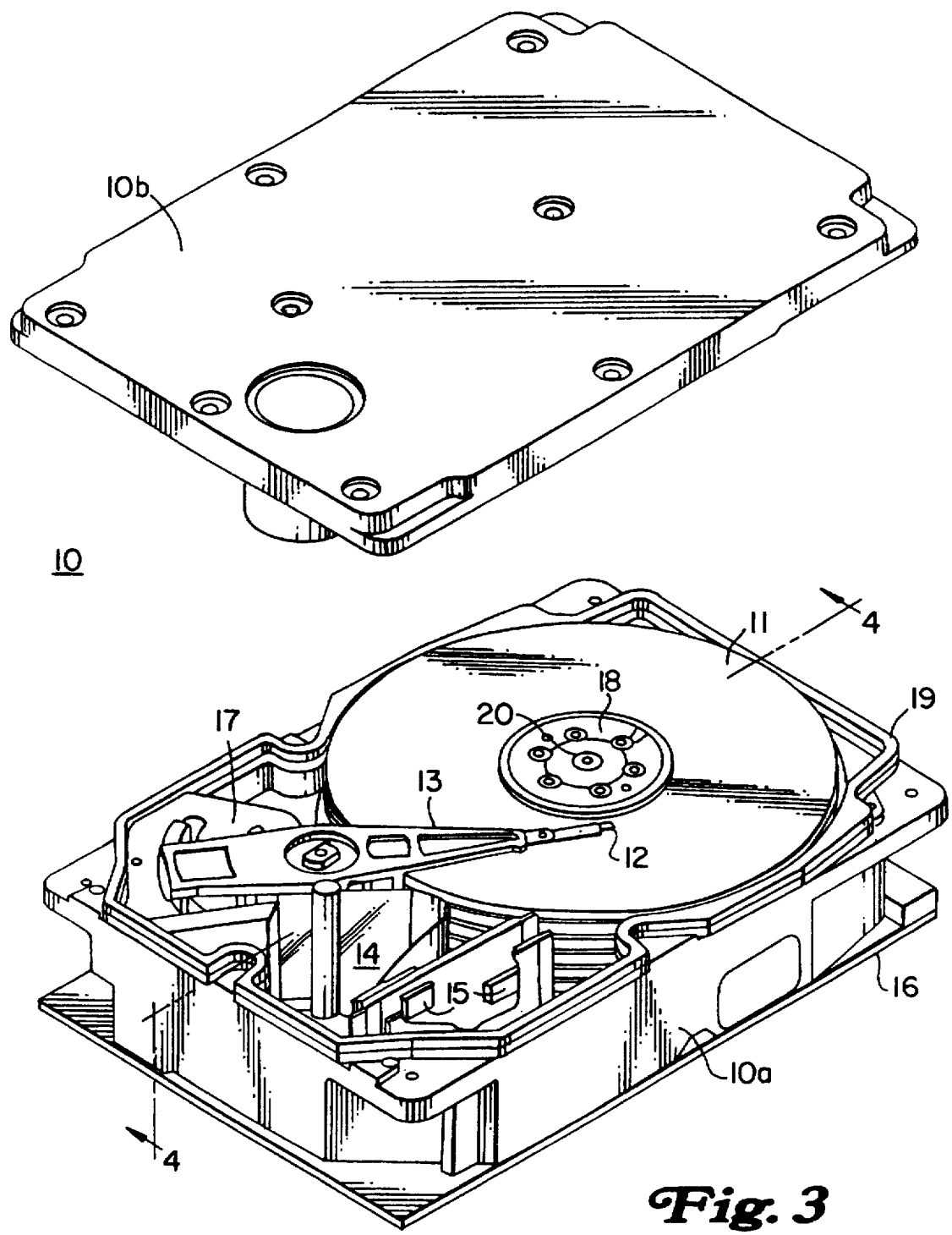
FIG. 3 is a perspective view of storage apparatus made in accordance with the present invention.

Shown in FIG. 3 is a rotary disk drive storage apparatus 10 having a housing that includes a base 10a and a cover 10b. A hermetic seal 19 seals the base 10a and cover 10b. A spindle motor 20 is secured to a plurality of magnetic disks 11 by a disk clamp 18. The disks 11 are stacked along the axis of the spindle 20.

A magnetic head 12 records, erases or reproduces information to or from the magnetic disks 11. The head 12 communicates with a slider (not shown) that includes an electromagnetic conversion element (not shown) formed using thin film technology.

The magnetic heads 12 are mounted on a suspension (not shown) that floats the heads 12 a predetermined height as the magnetic disks 11 are rotatably driven by the spindle motor 20. The magnetic heads 12 are supported by an actuator arm 13.

The actuator arm 13 is mounted on a voice coil motor 17. The voice coil motor 17 drives the magnetic heads 12 so that they move across the magnetic disks 11.

A Flexible Printed Circuit Sheet (FPCS) 14 is electrically connected to each magnetic head 12 and a head IC 15. A printed circuit board interface 16 receives a read/write instruction from a host apparatus (not shown), and the head IC 15 executes processing, such as preamplification (signal amplification), and switching of the heads, etc. in accordance with the read/write instruction.

Figure 4:
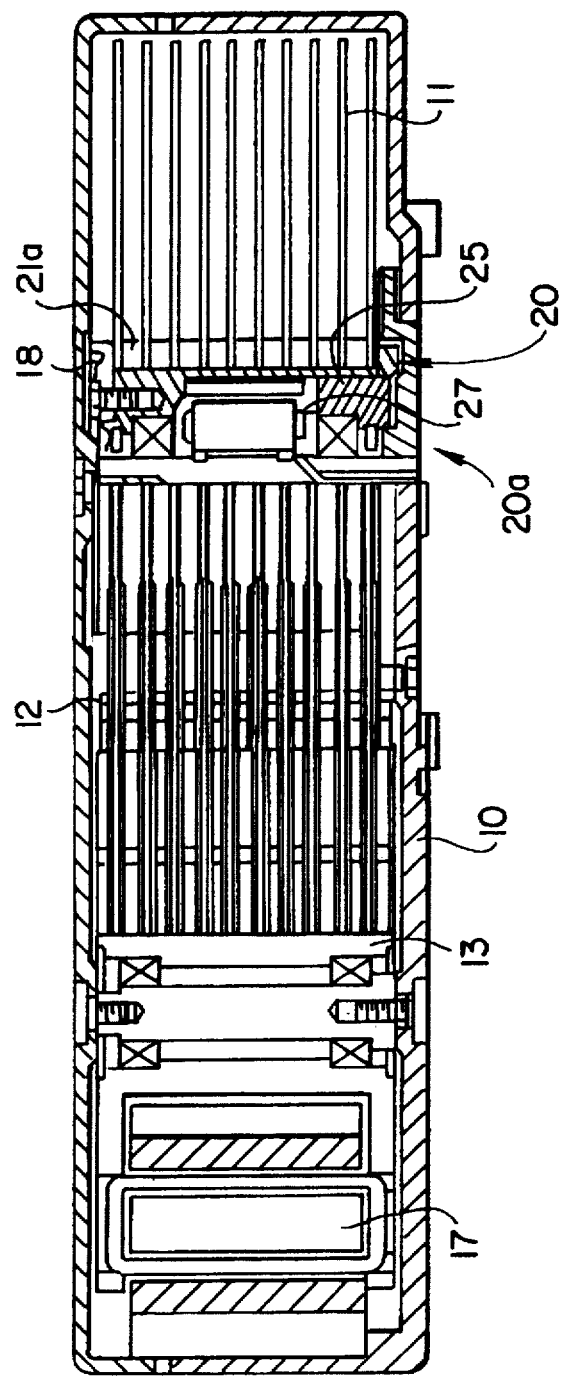
FIG. 4 is a cross-sectional view of FIG. 3 taken along lines 4—4 in FIG. 3.

As shown in FIG. 4, ten (10) magnetic disks 11 are stacked having nine (9) spacers 21a disposed between the disks 11. The disks 11 are fixedly secured with the disk clamp 18. The disks 11 are connected to a rotor 25 that is rotated by a stationary stator 27. The spindle motor 20 includes the rotor 25 and the stator 27. Twenty (20) magnetic heads 12 are connected to the arm 13. The voice coil motor 17 is also shown.

FIGS. 5, 6, 9 and 11 show several embodiments of the present invention. Like numbers refer to like parts.

The spindle mechanism 20 (FIG. 5) is fixed to the housing base 10a through pressurized insertion or screws via a flange 24. A shaft 23 defines the rotating axis of a spindle hub 21. An upper bearing 22a and a lower bearing 22b having rolling balls therein which contact the shaft 23 as the rotor 21 rotates. The shaft 23 includes a screw hole 29, which is fixed to the housing cover 10b (FIG. 3) of the storage apparatus by a screw (not shown).

The rotor 25 includes a magnet 25a and a yoke 25b which are fixed to the spindle hub 21 by a bonding agent or a tape. A stator coil 27a is wound around a stator core 27b to make up a stator 27. The stator could also be fixed to a base, a flange or some other part.

Located on the shaft 23 is an upper knurled slit 50a having an upper ring 51a fixed therein by a bonding agent. Also located on the shaft 23 is a lower knurled slit 50b having a lower ring 51b fixed therein by a bonding agent.

Upper slit 50a and lower slit 50b define the assembling positions of the rings 51a, 51b with respect to the stator 27 and the corresponding relation to the magnet 25a. Such positions must be set accurately to ensure that the positional relationship between the stator 27 and the magnet 25a is proper. Improper positioning would adversely affect the magnetic fields, resulting in potential axial vibration.

The upper and lower rings 51a, 51b, are preferably constructed from an elastic material, such as rubber, or a resin material such as plastic or the like. The bonding agent fixing the rings to the stator is preferably a glue, such as an elastomeric glue.

An annular gap 52 is fixed between the shaft 23 and the stator 27 to further dampen vibrations. The gap 52 may be filled with a bonding agent that is baked or hardened to form a gap member 53. The gap 52 may have an axial length in the range of about 0.2 mm to about 1 mm. Vibrations generated on the stator 27 are only partially transferred to the shaft 23 because the elastic rings 51a, 51b, the gap 52 and the gap member 53, if used, absorb at least a portion of the vibrations. Thus, shaft and motor vibration is dampened, or attenuated.

The assemblies shown in FIGS. 3–6 and 11 are made by centering the stator 27 between the upper and lower knurled slits 50a, 50b, respectively. Only a space of about 0.2 to 0.3 mm is allowed between the external diameter of the stator 27 and internal diameter of the magnet 25a. Therefore, the stator 27 and the magnet 25a must not touch even if the stator 27 and magnet 25a vibrate radially due to any concentric imperfections. The gap 52 between the rings 51a and 51b is filled with the elastic bonding agent in a radial thickness greater than the radial thickness of the rings 51a, 51*b*. The rings inhibit the bonding agent from overflowing, but any overflowing bonding agent should be removed to avoid an adverse affect on the surrounding components. Thereafter, the shaft 23 is heated to harden and bake the bonding agent, producing the annular gap member 53. As the bonding agent hardens, a gas may be given off.

Thereafter, the spindle motor 20 is completed by inserting the bearings 22*a*, 22*b*, inserting the spindle hub 21, mounting a bushing (not shown) and mounting the flange 24. In this embodiment, Cemedine EP-001 or the like may be used as the elastic bonding agent. Even when the stator 27 is mounted on the shaft 23, the elastic bonding agent absorbs stator vibration, which more effectively dampens and controls the transfer of vibration, while still securely holding the stator in place. Because the rings are hermetically sealed, the elastic bonding agent does not leak or release gas, which could have an adverse effect on other parts.

Figure 5:
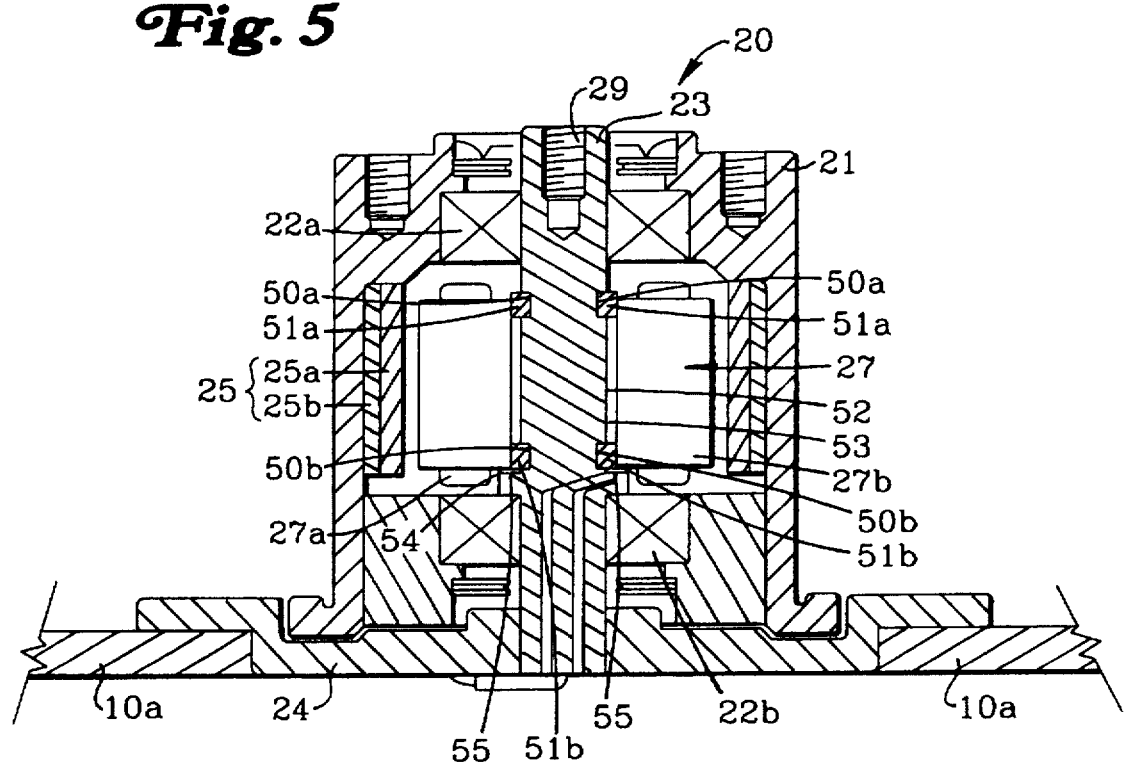
FIG. 5 is a diagram illustrating a first embodiment of the resent invention.
Figure 8:
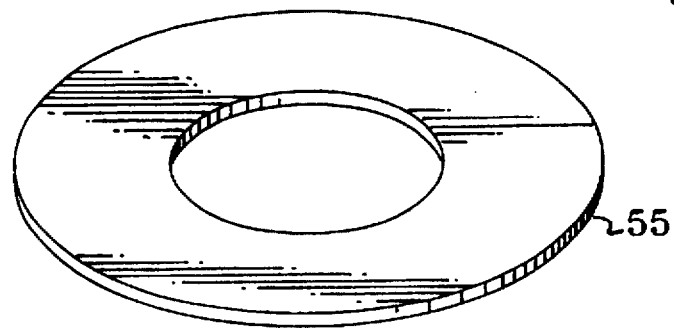
FIG. 8 is a perspective view of a sheet used in the present invention.

The stator 27 is supported by a rest 54 on the shaft 23. The rest 54 contacts an elastic sheet 55 as shown in FIGS. 5 and 8. The sheet 55 is between the rest 54 and the stator 27. The sheet 55 is made of a rubber or a resin material such as plastic, acrylic resin, a polyester, Mylar film, Nylon 66, or the like. Preferably, the sheet 55 has an axial thickness within a range of about 0.3 mm to about 1 mm. The stator 27 may merely contact the sheet 55, or, preferably, they are fixed with ordinary bonding agents. Because the sheet 55 is elastic, it also dampens vibrations emanating from the stator and reduces noise. Alternatively, the rest 54 may be positioned on the flange 24 or the base 10*a*. The rest 54 is preferably constructed from the same materials used to construct the rings in the form of a thick ring-shaped structure.

Japanese Laid-open Patent Application No. 62-287465 discloses the use of a viscous and elastic polymer material (VEM). However, formation of a thin film with this material results in bad workability and surface condition, and can result in a problem with regard to positioning accuracy because the width of the rising portion is only about 0.5 to 1 mm in a small size rotary driving apparatus. Therefore, the use of such viscous and elastic polymer material may not be effective, considering the influence of adhesion to the other parts and the generation of gas, etc.

The present invention is free from such problems because a member formed of the molded resin or rubber is used. In the present invention, moreover, it is also possible to use a thinner sheet of resin or rubber for the rest 54 by burning such material (lining processes, etc.).

As explained, high positioning accuracy of the stator 27 can be assured at the time of assembly by forming the rest 54 on the shaft 23. Moreover, since a resin sheet 55 is provided at the contact area between the stator 27 and the shaft 23, vibration is absorbed or attenuated.

In this embodiment, the rest 54 is provided on the shaft 23, but it is also possible to form the rising part on the flange 24 or base 10*a* which is used as the base member coupled with the shaft 23.

Figure 6:
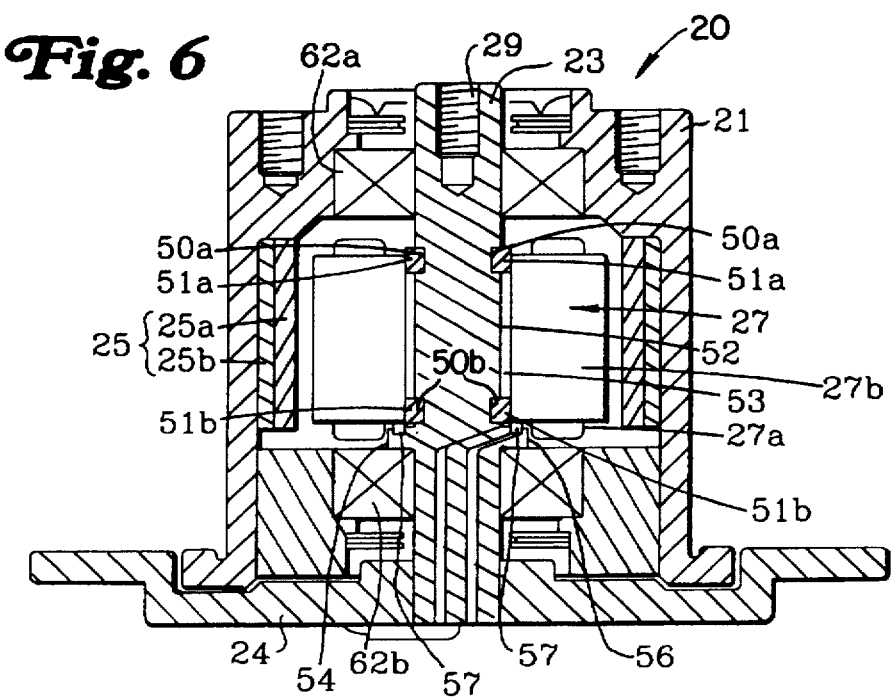
FIG. 6 is a diagram illustrating a second embodiment of the invention.

Shown in FIG. 6 is an aspect of the present invention including a ring-shaped slit 56 in the rest 54. The sheet 57 (which is a little thicker than the sheet 55) may also be constructed from a resin material such as acrylic resin, Nylon 55, plastic, a polyester or an elastic material such as rubber. The sheet 57 is concentrically fitted to the slit 56.

Vibration is dampened between the stator 27 and the rest 154 by the sheet 57 in the slit 56. Vibration generated by the stator 27 is absorbed and attenuated by the sheet 57.

Figure 7:
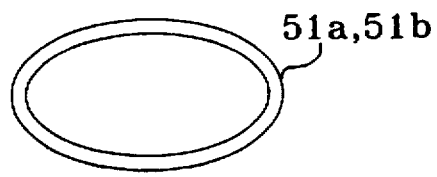
FIG. 7 is a perspective view of a ring used in the present invention.

FIG. 7 is a perspective view of the rings 51*a*, 51*b* having a hole diameter sized to fit the shaft 23. An O-ring having a thickness of about 1 mm to 3 mm is preferably used. The thickness depends on the size of the shaft and the slits.

FIG. 8 is a perspective view of the sheet 55 having a hole diameter sized according to the shaft and the rest. The sheet 55 is cut to more easily assemble the device.

Figure 9:
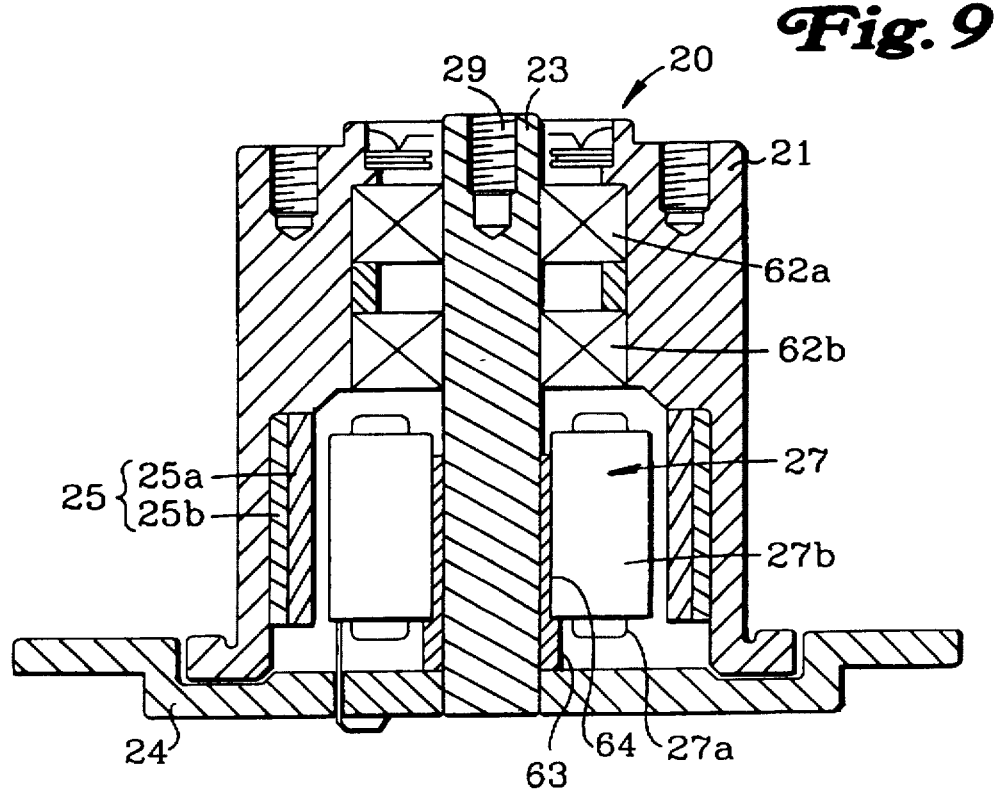
FIG. 9 is a diagram illustrating a third embodiment of the present invention.
Figure 10:
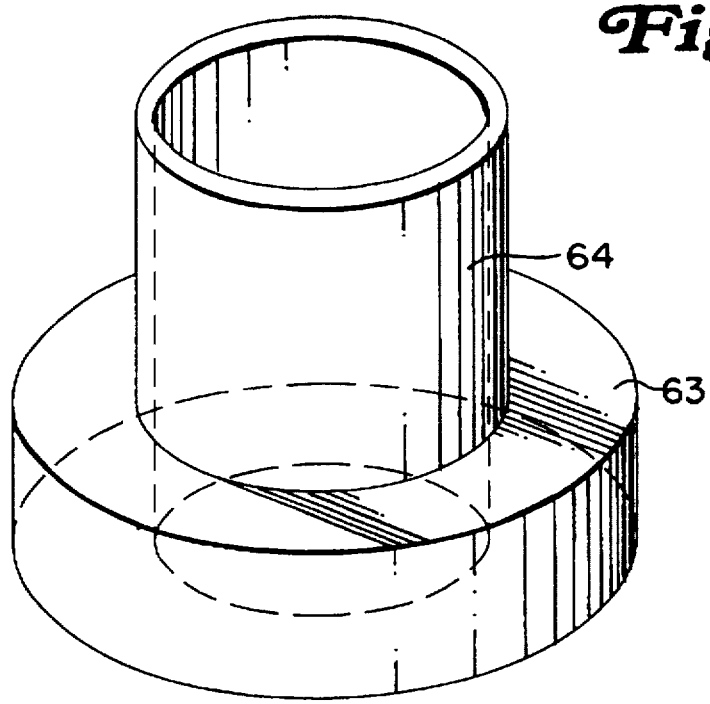
FIG. 10 is a diagram of a portion of the embodiment shown in FIG. 9.

FIGS. 9 and 10 illustrate another aspect of the rotary driving apparatus of the present invention. In this embodiment, the vibration dampening component is a tubular member 64 having a radially extended member 63. The member 64 is fixed between the stator core 27*b* and the shaft 23 by a bonding agent. The extended member 63 is secured to the stator core 27*b*, the shaft 23 and the base flange 24 by a bonding agent. Two bearings 62*a*, 62*b* are arranged in the upper side of the shaft 23.

The member 64 is a cylindrical body constructed from an elastic material such as rubber or a resin material, such as for example, nylon, or the like. The extended member 63 is constructed from the same materials. The inner surfaces of the members 63, 64 are fixed to the shaft 23 with a bonding agent.

The spindle motor 20 shown in FIG. 9 is assembled in the same manner as the spindle motors discussed above. The bonding agents are hardened by heat.

The structure shown in FIG. 9 effectively absorbs, dampens and attenuates vibration generated by the stator 27, thus controlling any transfer of vibration to the shaft 23.

Figure 11:
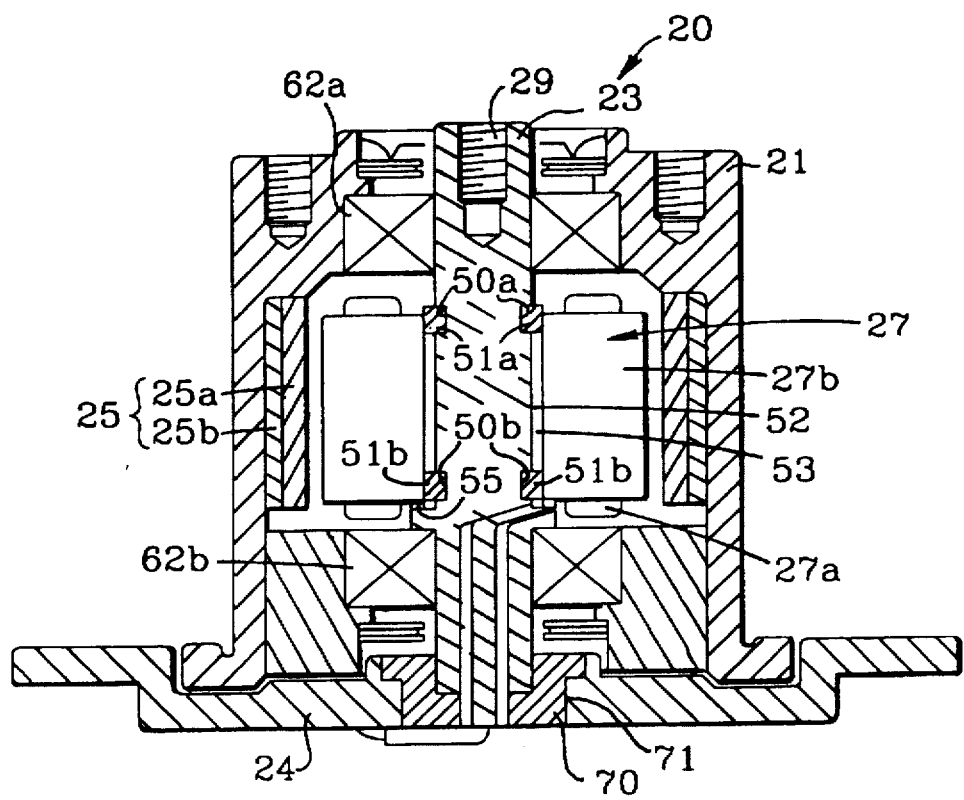
FIG. 11 is a diagram illustrating a fourth embodiment of the present invention.
Figure 12C:
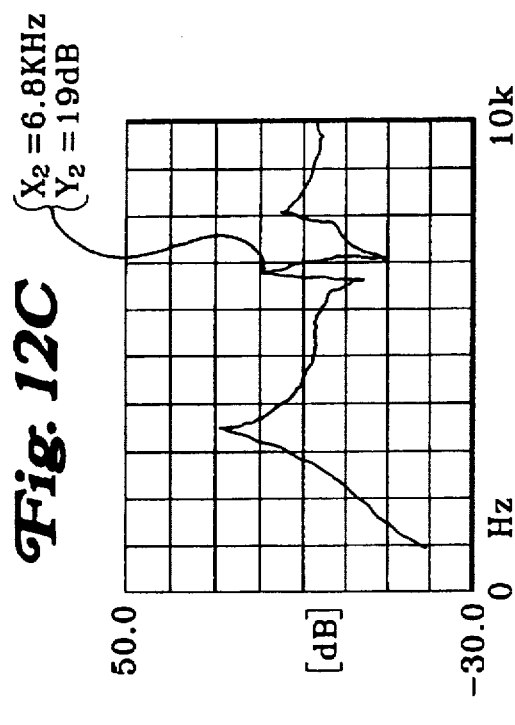
FIGS. 12(a), 12(b), 12(c) and 12(d) are graphs comparing the test results of the present invention with the prior art.
Figure 12D:
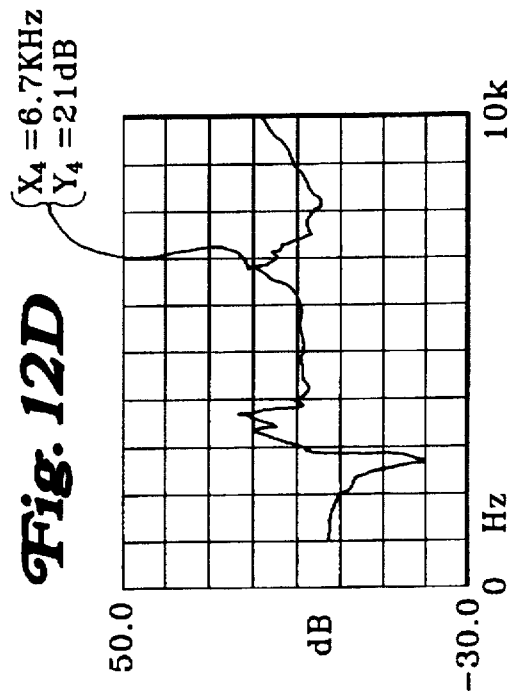
Figure 12A:
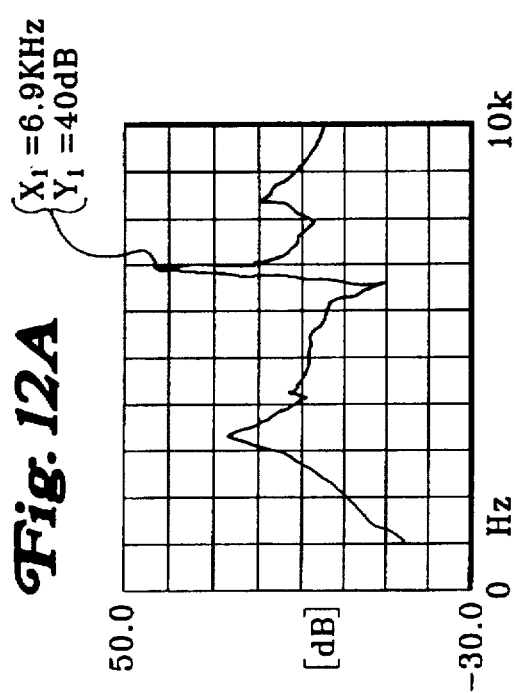
Figure 12B:
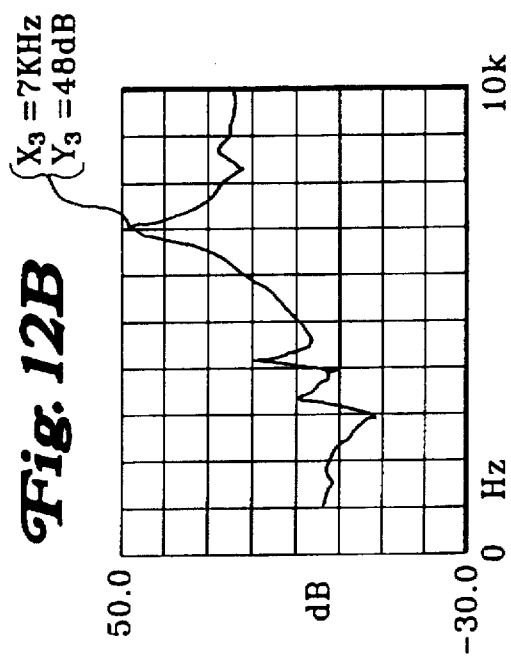

FIG. 11 illustrates another embodiment of the rotary driving apparatus of the present invention. A vibration damping member 70 is constructed from an elastic material such as rubber, or a resin material, such as plastic. The shaft 23 is inserted through an opening in the flange 24 by pressurized insertion, if desired. The member 70 is fixed to the shaft 23 and the flange 24 by a bonding agent. Preferably, the member 70 is constructed from a hard rubber which supports the shaft 23 more firmly.

The flange 24 includes a surface 71 fixed to the damping member 70. The damping member 70 is shaped to fit the surface 71. The member 70 mounts to the flange 24 by a bonding agent. Alternatively, the damping member 70 is fitted to the shaft 23 by a pressurized insertion method. The surface 71 may be cut out of the base 10*a* or the cover 10*b* (collectively the housing 10).

The damping member 70 absorbs vibration generated by the shaft 23, thus preventing such vibration from transferring to the flange 24 or the housing 10. Vibration transfer to the other parts, such as the head driving portion, is also reduced or prevented. As a result, vibrational influence on positioning accuracy for the head is reduced. Resultant noise is also reduced.

FIGS. 12(*a*)–(*d*) are graphs comparing the vibration and noise dampening effects of the present invention to the prior art. In these diagrams, the horizontal axis represents an applied vibration frequency of supplied electric current [Hz] and the vertical axis represents a gain, measured as the relative volume of noise [dB].

FIGS. 12(*a*) and 12(*c*) show frequency response for acceleration in the axial direction of the spindle motor. FIGS. 12(*b*) and 12(*d*) show frequency response in the twisting direction.

FIGS. 12(*a*) and 12(*b*) illustrate prior art devices where no damping stator holding member or damping member is present. FIGS. 12(*c*) and 12(*d*) illustrate the vibration damping of the present invention.

In comparing the gain or relative noise levels of the prior art (FIG. 12(*a*)) to the present invention (FIG. 12(*c*)) at a frequency of approximately 7 kHz in the axial direction, that is, the former gain $Y_1=40$ dB (at the frequency $X_1=6.9$ kHz) to the latter gain $Y_2=19$ dB (at the frequency $X_2=6.8$ kHz), the relative noise level gain is lowered by 21 dB in the axial direction. In comparing the gain of the prior art (FIG. 12(b)) to the present invention (FIG. 12(d)) in the frequency of approximately 7 kHz in the twisting direction, that is, the former gain $Y_3=48$ dB (with the frequency $X_3=7$ kHz) to the latter gain $Y_4=21$ dB (with the frequency $X_4=6.7$ kHz), the relative noise level gain is lowered by 27 dB in the axial direction. Thus, the present invention dampens and reduces vibration or noise in an unexpected and superior manner as compared to the prior art.

The present invention also controls vibration such as magnetic vibration, torsional resonance, bending resonance and deflection resonance. The present invention also controls generation of resultant noise by shielding, absorbing and attenuating vibration. As a result, the transfer vibrations are seriously lessened.

Moreover, the present invention also controls the generation of vibration and noise in the storage apparatus by shielding, absorbing and attenuating vibration generated by the rotary driving apparatus. Transfer of vibration is unexpectedly reduced or prevented.

The present invention thereby enables higher speed rotary driving and improves the head positioning accuracy and high speed access. Thus, recording density of the storage apparatus is unexpectedly improved.

We claim:

1. A rotary disk storage apparatus comprising:
   a housing;
   at least one storage disk provided within said housing;
   a motor having a stator and a rotor to drive said storage disk;
   a stator supporting member connecting said stator to said housing;
   a pair of damping rings interposed between the stator and the stator supporting member, and having outer surfaces projecting from a surface of the stator supporting member, said pair of damping rings cooperatively defining a gap with said stator and said stator supporting member; and
   a vibration absorbing member substantially filling the gap.

2. The apparatus of claim 1 wherein said damping rings are fixed by a first bonding agent, and said vibration-absorbing member is constructed of said first bonding agent.

3. The apparatus of claim 2 further including:
   a sheet shaped vibration dampener fixed between said stator and said stator supporting member by a second bonding agent.

4. The apparatus of claim 3 wherein said stator supporting member includes a slit, and said sheet is fixed in said slit.

5. An apparatus of claim 3 wherein said sheet is constructed from a rubber, an elastomer, an acrylic, a polyester or a nylon.

6. The apparatus of claim 1 wherein said damping rings are constructed from a rubber or an elastomer.

7. The apparatus of claim 1 wherein said vibration absorbing member comprises an elongated tubular member fixed between said stator and stator supporting member.

8. The apparatus of claim 7 wherein said an elongated tubular member is fixed by an adhesive bonding agent.

9. The apparatus of claim 8 wherein said adhesive bonding agent is an elastomeric adhesive.

10. The apparatus of claim 7 wherein said an elongated tubular member is constructed from a rubber, an elastomer, or a nylon.

11. The apparatus of claim 1 further comprising a flange attached to said stator supporting member; and
    a damper fixed between said stator supporting member and said flange by an adhesive bonding agent.

12. The apparatus of claim 1 wherein said housing is hermetically sealed around said rotary storage disk, said motor, said stator supporting means, and said dampening means.

13. The apparatus of claim 1 wherein said storage disk is one of a floppy disk, a magnetic disk, an optical disk, and a magneto-optical disk.

14. The apparatus of claim 1 wherein the rotary disk storage apparatus includes ten magnetic disks separated by a plurality of spacers.

15. The apparatus of claim 1 wherein said stator supporting member has a plurality of slits and said first and second rings are mounted on said slits.

16. A rotary disk storage apparatus comprising:
    a housing;
    at least one storage disk provided within said housing;
    a motor having a stator and a rotor to drive said storage disk;
    a shaft connecting said stator to said housing;
    a pair of damping rings interposed between the stator and the stator supporting member, and having outer surfaces projecting from a surface of the stator supporting member, said pair of damping rings cooperatively defining a gap with said stator and said stator supporting member; and
    a vibration absorbing member substantially filling said gap.

17. The apparatus of claim 16 wherein said damping rings are fixed by a first bonding agent, and said vibration-absorbing member is constructed of said first bonding agent.

18. The apparatus of claim 17 further including
    a sheet shaped vibration dampener fixed between said stator and said stator supporting member by a second bonding agent.

19. The apparatus of claim 18 wherein said stator supporting member includes a slit, and said sheet is fixed in said slit.

20. The apparatus of claim 18 wherein said sheet is constructed from a rubber, an elastomer, an acrylic, a polyester or a nylon.

21. The apparatus of claim 16 wherein said damping rings are constructed from a rubber or an elastomer.

22. The apparatus of claim 16 comprising an elongated tubular member fixed between said stator and said stator supporting member.

23. The apparatus of claim 22 wherein said an elongated tubular member is fixed by an adhesive bonding agent.

24. The apparatus of claim 23 wherein said adhesive bonding agent is an elastomeric adhesive.

25. The apparatus of claim 22 wherein said an elongated tubular member is constructed from a rubber, an elastomer, or a nylon.

26. The apparatus of claim 16 further comprising:
    a flange attached to said stator supporting member; and
    a damper fixed between said stator supporting member and said flange by an adhesive bonding agent.

27. The apparatus of claim 16 wherein said shaft has a plurality of slits and said first and second rings are mounted on said slits.

28. A rotary disk storage apparatus comprising:

at least one rotary storage disk secured to a rotor of a motor;

said motor also having a stator which is fixed within the storage apparatus, wherein the stator creates vibration during operation;

a shaft fixed within the storage apparatus;

at least one bushing fixed to the rotor and contacting the shaft;

a head for writing information to and reproducing information from said rotary storage disk;

first and second rings and an annular member fixed between said stator and said shaft, wherein said first and second rings are fixed by an adhesive bonding agent and have outer surfaces projecting from a surface of said shaft, and wherein said annular member is constructed of said adhesive bonding agent;

said shaft having a stator supporting member;

a sheet fixed between said stator and said stator supporting member by a second bonding agent.

29. The apparatus of claim 28 wherein said sheet is in the shape of a third ring.

30. The apparatus of claim 28 wherein said shaft has a plurality of slits and said first and second rings are mounted on said slits.

* * * * *